United States Patent [19]
Chance

[11] Patent Number: 4,932,714
[45] Date of Patent: Jun. 12, 1990

[54] DEMOUNTABLE DOOR FOR A GOLF CART OR THE LIKE

[76] Inventor: Harold Chance, P.O. Box 9567, Wichita, Kans. 67277

[21] Appl. No.: 245,581

[22] Filed: Sep. 16, 1988

[51] Int. Cl.⁵ .............................................. B60J 5/06
[52] U.S. Cl. .................................... 296/148; 296/202; 49/246; 49/248; 280/DIG. 5
[58] Field of Search ............... 296/146, 147, 148, 77.1; 49/246, 248; 280/DIG. 5

[56] References Cited

U.S. PATENT DOCUMENTS

| | | | |
|---|---|---|---|
| 3,709,553 | 1/1973 | Churchill et al. | 280/DIG. 5 X |
| 4,013,315 | 3/1977 | West | 280/DIG. 5 |
| 4,098,536 | 7/1978 | Mills | 296/77.1 |
| 4,162,097 | 7/1979 | Scribner | 296/146 X |
| 4,621,859 | 11/1986 | Spicher | 296/77.1 |

FOREIGN PATENT DOCUMENTS

| | | | |
|---|---|---|---|
| 1174183 | 7/1964 | Fed. Rep. of Germany | 49/246 |
| 1254483 | 11/1967 | Fed. Rep. of Germany | 296/146 |
| 191120 | 11/1982 | Japan | 296/146 |
| 50312 | 11/1965 | Poland | 296/146 |
| 394318 | 6/1933 | United Kingdom | 49/246 |

*Primary Examiner*—Margaret A. Focarino
*Assistant Examiner*—Gary C. Hoge
*Attorney, Agent, or Firm*—Scrivener and Clarke

[57] ABSTRACT

A demountable door for a golf cart consists of a panel of clear plastic which is translatably attachable to the cart by links for movement across an access opening in the side of the cart. Two links are attached at one end to a strap which can be releasably connected to the upper end of the panel with the other end of the links attached to the cart. A third link is connected to the lower end of the panel and the cart. When the strap is released the lower link is lifted with the panel clear of a pivot socket on the cart whereby the panel can be mounted or demounted in seconds.

9 Claims, 2 Drawing Sheets

DEMOUNTABLE DOOR FOR A GOLF CART OR THE LIKE

This invention relates to doors for an access opening in the side of a vehicle and more particularly to a demountable door for a golf cart or the like.

Many self-propelled vehicles, such as a golf carts have sun roofs and windshields but otherwise are entirely open which is desirable when the carts are used during the hot days of summer. In the early spring and fall the days can be cool, which is quite satisfactory for playing golf but can be uncomfortable when riding in an open golf cart. There has thus been a need to enclose easily the interior of a golf cart by the use of readily mountable and demountable panels while providing access openings in the sides of the cart. For the access openings there must, of course, be doors and the immediate apparent solution is to provide sliding doors. These, however, can cause problems in the case of a golf cart having a short wheel base, because, when the door is open, it can overlap the rear wheel and since all of the wheels have anti-splash guards, i.e. fenders, which extend away from the sides of the vehicle to a certain extent, it is virtually impossible to rely on sliding doors since the lower track therefore, as a practical matter, cannot extend rearwardly beyond the splash guard. The solution to this problem is to provide a translationally movable door which, per se, is old.

The object of the present invention is to provide a translationally movable door for a golf cart or the like which is readily mountable or demountable when the cart is to be converted from or to its open configuration.

Other objects and their attendant advantages will become apparent as the following detailed description is read in conjunction with the accompanying drawings wherein.

Figure 1:
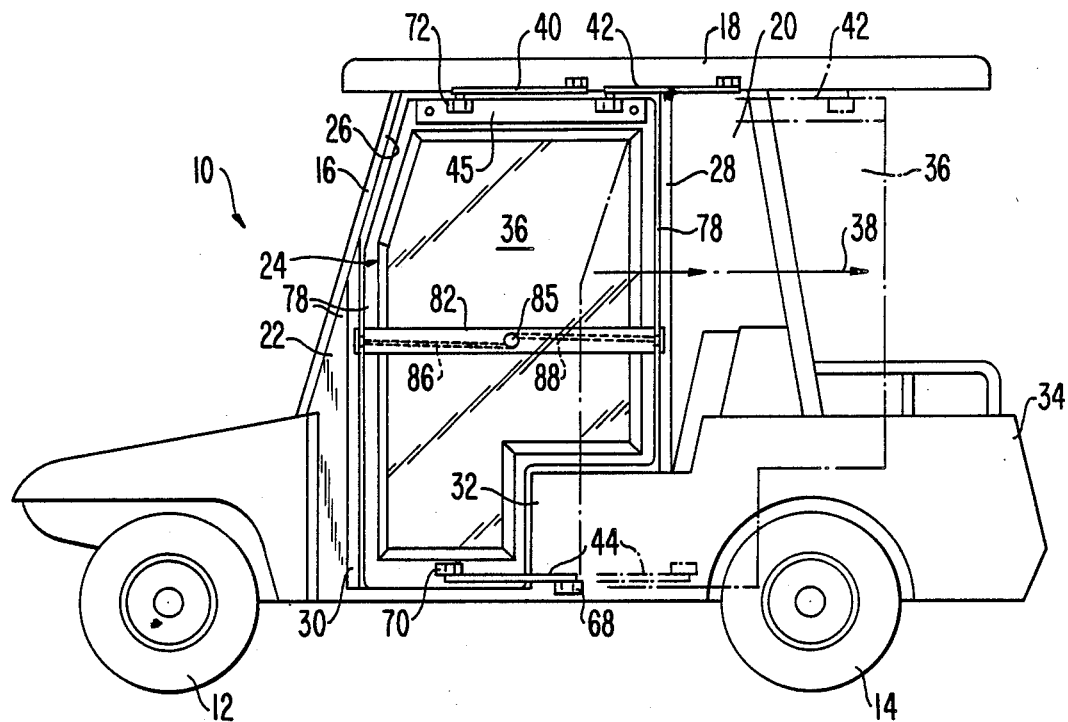
FIG. 1 is a side elevational view of a golf cart carrying the demountable door of the invention.

Referring now to the drawings, the numeral 10 designates a vehicle which may be a golf cart or the like and hereafter will be referred to as a golf cart though it will be readily apparent that the invention is not restricted to a golf cart. The cart shown has front and rear wheels, 12, 14, a windshield 16 and a roof 18. Except for the windshield and roof, the interior of the cart is normally open and though the sides and back can be fairly simply closed with transparent plastic panels, such as the side panel 20, 22, it is essential that, after these are installed, there be provided access openings through the otherwise now closed sides of the cart and these openings must be controlled by doors and the doors must be readily mountable or demountable.

In accordance with the invention there is provided a demountable door assembly 24 for an access opening 26 defined between the roof 18, vertical frame members 28, 30 at the facing inner edges of the side panels 20, 22, respectively and a stepped portion 32 of the side 34 of the cart. The door of the assembly comprises a panel 36, preferably of transparent plastic material, which is adapted to be connected to the cart body for translational movement across the opening 26 to open and close it as indicated by the arrows 38 in FIGS. 1 and 2. Link means are provided for connecting the panel 36 to the cart for the translational movement from the closed position, indicated by full lines in FIG. 1 to the open position indicated by the phantom lines, and vice versa.

The link means comprises at least three links of equal length, two of which 40, 42 may be at the upper edge of the panel and one of which 44, may be at the lower edge of the panel. As the description proceeds it will be apparent that the position of the links may be reversed and if space permits and it is desirable instead of a single link 44 there may be two such links.

Figure 3:
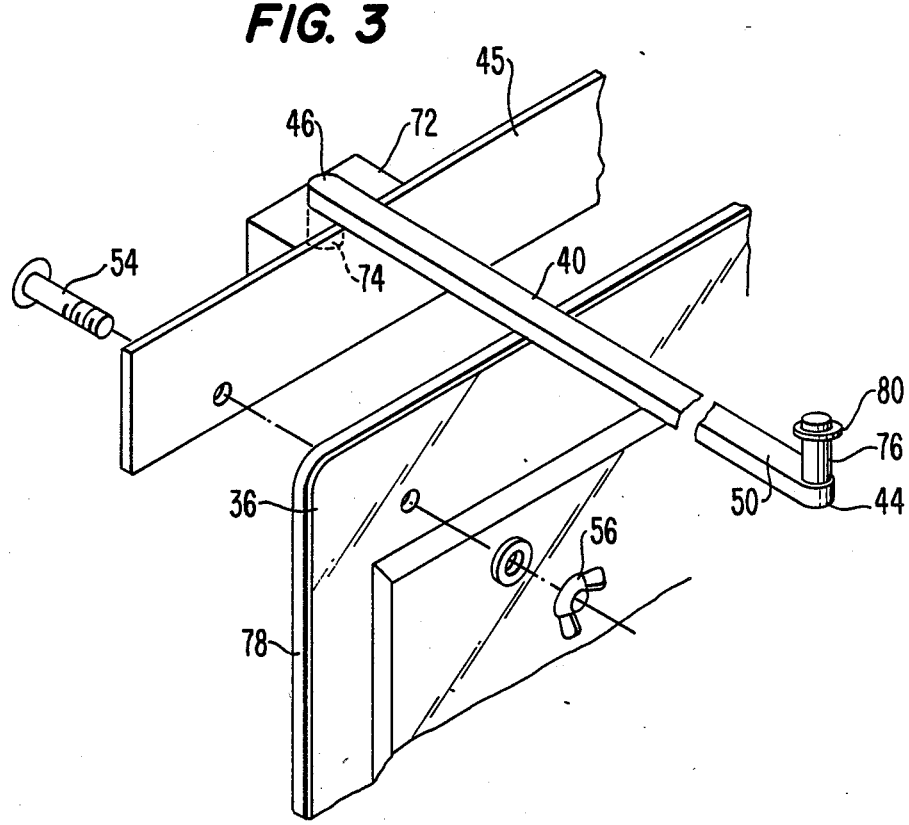
FIG. 3 is an enlarged broken perspective view of the upper end of the door.

In accordance with the invention, means are provided for releasably and pivotally connecting the two links, 40, 42, to the panel comprising a strap 45, the links 40, 42 having their outer or first ends 46, 48 pivotally connected in horizontally spaced relationship to the strap 45 with their inner or second ends 50, 52 being adapted to be pivotally mounted in equally horizontally spaced relationship to the side of the cart. In accordance with the invention, means are provided for releasably fastening the strap 45 rigidly to one face of the panel 36. Though it is within the purview of the invention for the strap to be fastened to either the inner or outer face and adjacent either the upper or lower edge of the panel, preferably the strap is releasably fastened to the outer face adjacent the upper edge of the panels with the links 40, 42 extending over the upper edge of the panel as shown in FIG. 3. The releasable fastening means could be any such means, the bolt 54 shown passing through aligned openings in the strap and panel to receive a butterfly nut 56 being representative.

Figure 4:
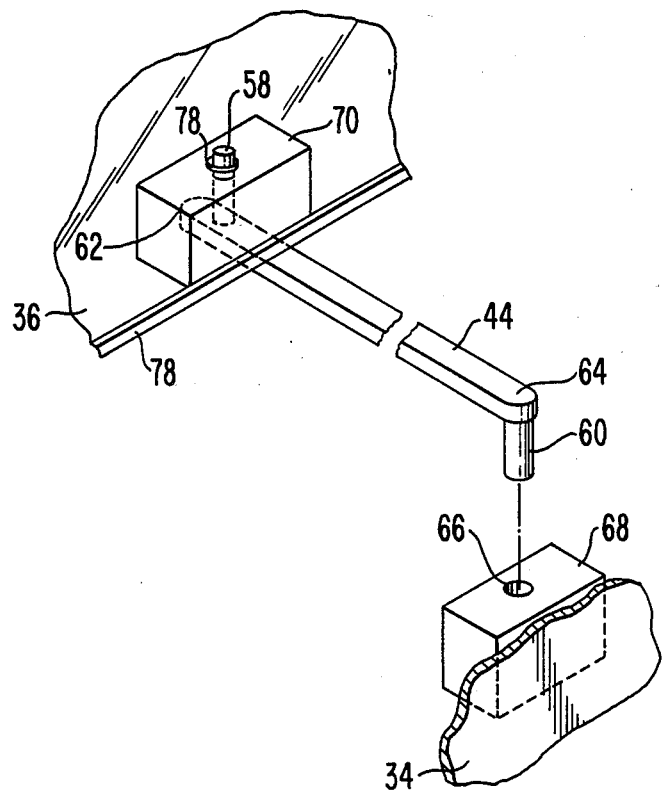
FIG. 4 is a broken perspective view of the lower end of the door and a portion of the vehicle side.

With the two links 40, 42 which are connected to the strap 45 being at the top of the panel, the third link 44 is adjacent the lower edge of the panel as shown in FIG. 4. The third link has means, such as the pins 58, 60 at its first and second ends 62, 64 for pivotal connection with the panel 36 and with the side 34 of the golf cart. At least one of the connections from the third link is releasable following release of the fastening means 54, 56 for the strap 45.

It is convenient to provide the ends of all of the links with oppositely extending vertical pins so that all of the links, as a matter of economy, are identical. The pins are received in sockets, such as the socket 66 in the bearing block 68 rigidly joined by any suitable means to the side 34 of the cart. The pin 58 at the opposite end of the link 44 is received in a socket in a bearing block 70 rigidly fixed to the outer face of the panel, the link 44 passing under the lower edge of the panel. By having the bearing blocks (note the bearing block 72 on the strap 45 in FIG. 3) on, or adjacent the outer face of the panel, no provision, such as recesses, in the body need be provided in the cart body to accommodate the blocks when the door is closed.

The outer pin 58 of the lower link 44 and the pins 74, 76 on the upper link 40 (identical pins are on the other upper link 42) can be retained against ready separation from their sockets in the respective bearing blocks in any convenient manner, the circlips 78, 80 on the respective pins 58, 76 of the links 44, 40 being representative.

The invention also includes the combination of the door and the golf cart and in accordance with the invention one of the lower pins, preferably the inner pin of downwardly extending to be received in the upwardly extending socket 66 whereby upon release of the 45 the pin 60 may be slid freely upwardly clear of the socket with the lower link remaining with the panel.

Figure 2:
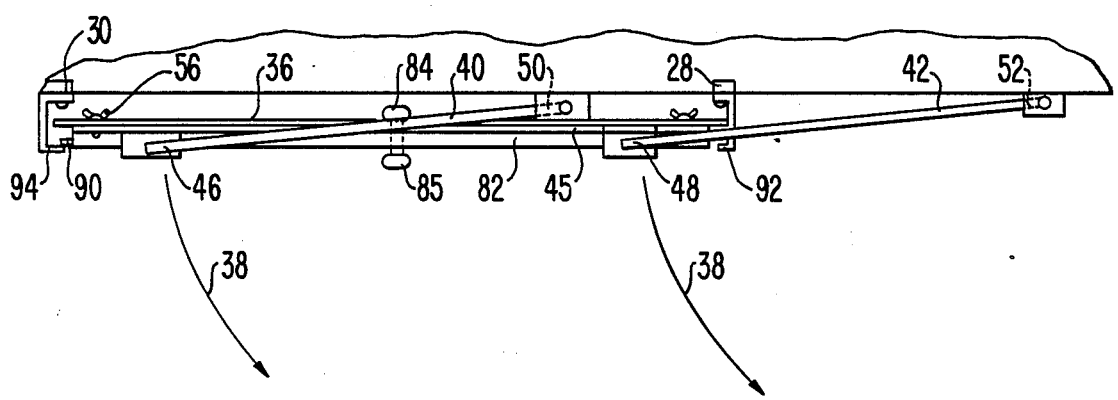
FIG. 2 is an enlarged plan view looking toward the top of the door in its closed position.

The panel 36 may be provided with a peripheral metal frame 78 and extending between two vertical portions of the frame along the front and rear edges of the panel is a horizontal strap 82 centrally carrying inner and outer knobs 84, 85 (see FIG. 2) for operating a pair of oppositely acting rods 86, 88 (FIG. 1) carrying at their outer ends latches, one only being visible at 90 in FIG. 2. These latches are engagable behind latch plates 92, 94 fixed to the frame members 28, 30 to retain the panel in its closed condition of FIG. 2.

When the door is demounted the strap and upper links may remain with the cart and suitable latch means (not shown) may be provided for retaining the strap and links in, say, their rearward position on the cart.

When the door is to be mounted the inner pin 60 of the lower link 44 is simply slid into its socket 66 and the butterfly nuts are screwed into the bolts passing through the openings in the strap and panel. For demounting, the butterfly nuts are first removed to release the strap and the pin 60 then slid clear of its socket the entire procedure in either case taking only seconds. The frames of the stationary side panels 20, 22 are also fastened in place by the use of butterfly nuts (not shown) and the cart may have a folding rear panel (not shown) which can be stored in a raised position under the roof when the cart is in its open configuration.

Having now described the invention what I claim is:

1. A demountable door assembly for controlling an access opening in the side of a golf cart or the like comprising a panel adapted to be connected to said body for translational movement across said opening to open and close the same, link means for connecting said panel to said golf cart or the like for said translational movement comprising at least three links; means for releasably and pivotally connecting two of said links to said panel comprising a strap separate from said panel, said two links having their first ends pivotally connected in horizontally spaced relationship to said strap and having their second ends adapted to be pivotally mounted in horizontally spaced relationship to the side of a golf cart or the like, and means for releasably fastening said strap rigidly to one face of the panel adjacent one of its lower and upper edges; said third link including means at its first and second ends for pivotal connection with said panel adjacent the other of its lower and upper edges and with the side of said golf cart or the like, respectively, at least one of said last mentioned connection means being releasable following release of said fastening means for said strap.

2. The assembly of claim 1, wherein said releasable means for said strap is arranged to fasten said strap to the outer face of said panel adjacent the upper edge thereof with said two links passing over the upper edge of said panel, said third link being pivotally connected to the outer face of said panel adjacent its lower edge, said third link passing beneath said lower edge of said panel.

3. The assembly of claim 2, including said golf cart wherein said second ends of said two links are pivotally connected to the side of said golf cart and wherein the connecting means at the first end of said third link connects said third link to said panel, the connecting means at the second end of said third link connecting said third link to the side of said golf cart, said last mentioned connecting means being releasable from said golf cart upon release of said fastening means from said strap.

4. The assembly of claim 3, wherein said releasable connecting means comprises a vertically extending pin carried by one of said second end of said third link and the side of said golf cart and a socket carried by the other of said second end and said golf cart or the like whereby said third link can be separated from the socket of said golf cart by free relative vertical sliding movement between said socket and pin.

5. The assembly of claim 4, wherein the pin extends downwardly from the second end of said third link and the socket is carried by the side of said golf cart and extends vertically upwardly.

6. The assembly of claim 4, wherein the at least three links comprise two links only at the upper end of said panel and one link only at the lower end of said panel.

7. The assembly of claim 6, including manually operable latch means for retaining said panel in its closed position.

8. The assembly of claim 1, wherein said three links are of equal length.

9. The assembly of claim 8, wherein the horizontal spacing between the second ends of said two links is equal to the horizontal spacing of the pivotal connection of first ends of said two links with said strap.

* * * * *